US006737971B2

(12) United States Patent
Knaak

(10) Patent No.: US 6,737,971 B2
(45) Date of Patent: May 18, 2004

(54) APPARATUS FOR DETECTING AN OBJECT APPROACHING A VESSEL AND ASSOCIATED METHOD

(76) Inventor: Theodore F. Knaak, 8519 Summerville Pl., Orlando, FL (US) 32819

( * ) Notice: Subject to any disclaimer, the term of this patent is extended or adjusted under 35 U.S.C. 154(b) by 0 days.

(21) Appl. No.: 10/165,035

(22) Filed: Jun. 7, 2002

(65) Prior Publication Data

US 2002/0186149 A1 Dec. 12, 2002

Related U.S. Application Data

(60) Provisional application No. 60/296,662, filed on Jun. 7, 2001.

(51) Int. Cl.[7] .............................................. G08B 13/18
(52) U.S. Cl. ........................ 340/557; 340/435; 340/436; 340/573.6; 340/551; 340/561; 340/853.2; 340/506
(58) Field of Search ................................. 340/557, 556, 340/555, 551, 552, 561, 573.6, 851, 853.2, 853.3, 854.1, 435, 436, 506; 114/1, 18

(56) References Cited

U.S. PATENT DOCUMENTS

| | | |
|---|---|---|
| 4,290,043 A | 9/1981 | Kaplan |
| 4,418,360 A | 11/1983 | Glasgow |
| 4,626,905 A | 12/1986 | Schmidt |
| 4,806,731 A | 2/1989 | Bragard et al. |
| 4,806,761 A | 2/1989 | Carson et al. |
| 4,917,323 A | 4/1990 | Wing |
| 4,977,323 A | 12/1990 | Jehle |
| 4,980,565 A | 12/1990 | Jehle |
| 4,982,092 A | 1/1991 | Jehle |
| 5,146,287 A | 9/1992 | Carder |
| H1231 H * | 9/1993 | Richards ..................... 340/850 |
| 5,347,391 A | 9/1994 | Cook et al. |
| 5,646,907 A * | 7/1997 | Maccabee ..................... 340/555 |

(List continued on next page.)

OTHER PUBLICATIONS

Web Page *Principle Of A Pulsed Laser Sensor*; www.r-iegl.com; Dated Jun. 4, 2002.
Web Page *Key Features Of A Pulsed Laser Sensor*; www.r-iegl.com; Dated Jun. 4, 2002 (2 pages).
Web Page *Operation Of A Pulsed Laser Distance Meter*; www.riegl.com; Dated Jun. 4, 2002.
Web Page *Operation Of A Pulsed Semicondustor Laser* ; www.riegl.com; Dated Jun. 4, 2002 (2 pages).
Web Page *Reflectivity Of Various Surfaces/Materials*; www.riegl.com; Dated Jun. 4, 2002 (3 pages)..
Web Page *Maximum Range Versus Reflectivity Of The Target*; www.riegl.com; Dated Jun. 4, 2002.

(List continued on next page.)

*Primary Examiner*—Jeffrey Hofsass
*Assistant Examiner*—Daniel Previl
(74) *Attorney, Agent, or Firm*—Allen, Dyer, Doppelt, Milbrath & Gilchrist, P.A.

(57) ABSTRACT

An apparatus and method for detecting an object approaching a vessel at rest on a water surface include a laser light curtain comprising at least one pulsed laser light beam extending radially from the ship toward a perimeter thereabout, the laser light curtain positioned spaced apart from and approximately parallel to an approach surface for detecting an object interrupting the light curtain; at least one pulsed laser rangefinder connected to the ship and positioned outboard therefrom to generate the laser light curtain; a power source connected to the pulsed laser rangefinder to supply power thereto; a processor connected to the pulsed laser rangefinder to process data therefrom; and at least one display connected to the processor to display information obtained from the processed data.

38 Claims, 7 Drawing Sheets

U.S. PATENT DOCUMENTS

| | | | | |
|---|---|---|---|---|
| 5,760,887 | A | * | 6/1998 | Fink et al. .................. 356/5.03 |
| 5,787,369 | A | * | 7/1998 | Knaak ......................... 340/435 |
| 5,790,183 | A | | 8/1998 | Kerbyson |
| 5,838,262 | A | | 11/1998 | Kershner et al. |
| 6,208,248 | B1 | * | 3/2001 | Ross ........................... 340/552 |
| 6,231,002 | B1 | | 5/2001 | Hibma et al. |
| 6,231,003 | B1 | | 5/2001 | Hibma et al. |
| 6,327,955 | B1 | | 12/2001 | Kerdraon et al. |
| 6,354,892 | B1 | * | 3/2002 | Staerzl ........................... 440/1 |
| 6,380,871 | B1 | * | 4/2002 | Kaplan ......................... 340/984 |
| 6,396,577 | B1 | * | 5/2002 | Ramstack ................. 356/141.1 |
| 6,487,519 | B1 | * | 11/2002 | O'Neil ......................... 702/176 |

OTHER PUBLICATIONS

Web Page *How To Use RIEGL Laser Instruments Within Explosion Endangered Area*; www.riegl.com; Dated Jun. 4, 2002 (3 pages).

Web Page *Interfacing RIEGL Laser Instruments With A PC*; www.riegl.com; Dated Jun. 4, 2002 (3 pages).

Web Page *Last Pulse Measuring Technique*; www.riegl.com; Dated Jun. 4, 2002 (4 pages).

Web Page *Short–Range Airborne Laser Scanner LMS–Q140i–60/80*; www.riegl.com; Dated Jun. 4, 2002 (4 pages).

Web Page *Long–Range Airborne Laser Scanner LMS–Q280*; www.riegl.com; Dated Jun. 4, 2002 (4 pages).

Web Page *Maximum Range As A Function Of Visibility*; www.riegl.com; Dated Jun. 4, 2002 (2 pages).

* cited by examiner

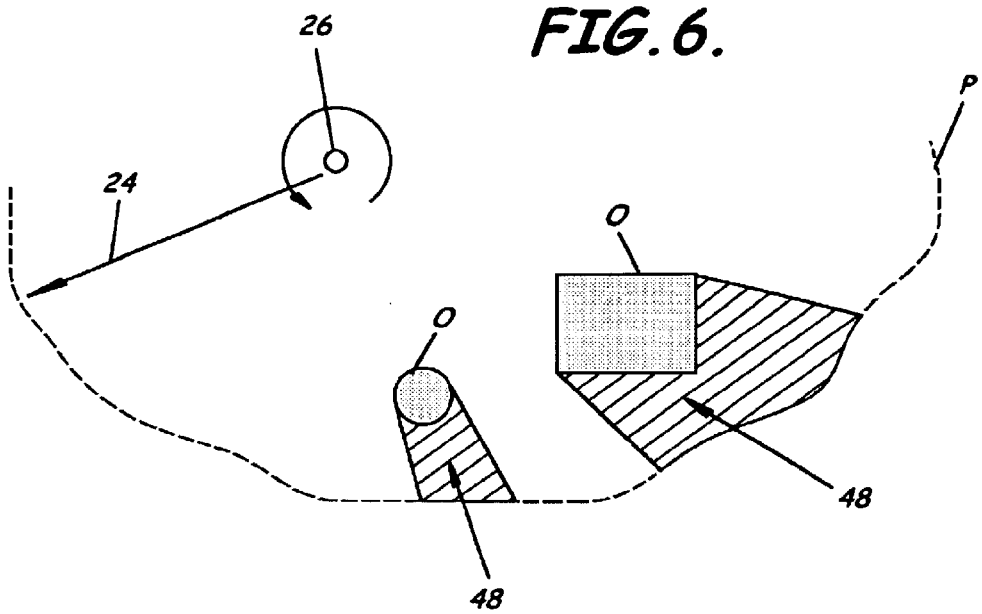
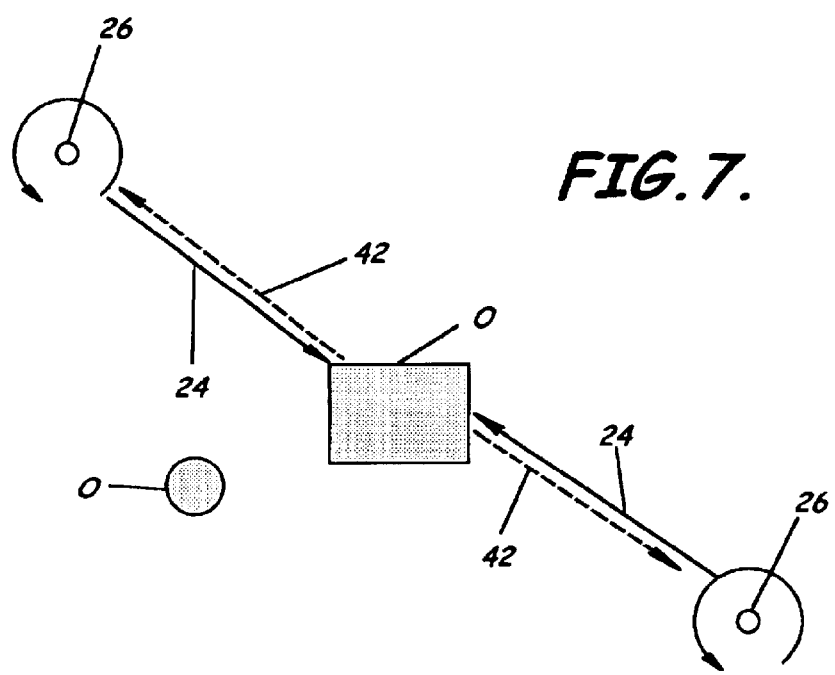

APPARATUS FOR DETECTING AN OBJECT APPROACHING A VESSEL AND ASSOCIATED METHOD

RELATED APPLICATION

This application claims priority from co-pending provisional application Serial No. 60/296,662, which was filed on Jun. 7, 2001, and which is incorporated herein by reference in its entirety.

FIELD OF THE INVENTION

The present invention relates to the field of marine vessels and, more particularly, to an apparatus and method for detecting an object interrupting a perimeter about a vessel at rest on the water. The invention is applicable to any watercraft, including pleasure craft, as well as merchant and military vessels.

BACKGROUND OF THE INVENTION

Recent events have made it increasingly evident that docked military ships and other vessels are vulnerable to the threat presented by the approach of one or more small boats and/or ground vehicles from dockside. These threats increase significantly when a ship is at anchor or docked in a foreign port where port security standards may be low and subject to penetration by adversary forces.

The harbor environment is generally very complicated, as typically there is much activity and many ships and smaller boats are in close proximity. Several security guards posted around the ship would be required to provide complete coverage. However, humans are subject to fatigue brought on by long hours of watch duty. In addition, night coverage presents obvious problems for the security guard, as constant illumination of the vessel and it surroundings is generally not practical.

In the realm of pleasure craft such as yachts and the like, it is well known that occassionally a vessel moored, anchored, or docked may be approached and boarded by modern day pirates. The apparatus and method herein described are equally applicable for providing a level of added vessel security for these pleasure craft and their crews and passengers. In addition, for example, with leasure passenger cruise ships, the presentely described invention could be employed as a warning system to indicate that a passenger launch is approaching the ship, and an alarm triggered thereby would alert the crew to be prepared to receive the launch and its passengers. Additional applications of the invention will, no doubt, occur to those skilled in the art.

Accordingly, there is a need for an automated system capable of maintaining constant observation of the vessel perimeter. Such a sensor system should be inconspicuous, reliable, and versatile enough to accommodate the varying target signatures in the harbor environment. In addition, the apparatus should be sufficiently sturdy to survive the adverse conditions of the marine environment, which over time will be encountered even in sheltered harbors.

SUMMARY OF THE INVENTION

With the foregoing in mind, the present invention advantageously provides for a ship at rest on a water surface, an apparatus for detecting an object approaching the ship along an approach surface, which could be the surface of the water, or the surface of a dock, for example. The apparatus includes a laser light curtain, a pulsed laser rangefinder to generate the laser light curtain, a power source, a processor to obtain and process data from the rangefinder, and at least one display to display information obtained from the processed data.

The laser light curtain comprises at least one pulsed laser light beam extending radially from the ship toward a perimeter thereabout, the laser light curtain being positioned spaced apart from and approximately parallel to the approach surface for detecting an object interrupting the light curtain. At least one pulsed laser rangefinder is connected to the ship and positioned outboard therefrom to generate the laser light curtain. A power source is connected to the pulsed laser rangefinder to supply power thereto. A processor is connected to the pulsed laser rangefinder to process data therefrom, and at least one display connected to the processor to display information obtained from the processed data.

The invention includes a method embodied in the disclosed apparatus. The method includes deploying at least one pulsed laser rangefinder adjacent the ship and outboard therefrom so as to be a predetermined distance spaced apart from the approach surface, be that the surface of the water or the surface of a dock or pier. The rangefinder operates by generating a pulsed laser beam from the pulsed laser rangefinder, and reflecting the generated pulsed laser beam from a rotating mirror in the pulsed laser rangefinder so as to form a laser light curtain spaced apart from the approach surface and extending away from the ship along at least a partial radial perimeter about the pulsed laser rangefinder. The method then includes detecting a pulsed laser beam reflected back to the pulsed laser rangefinder from an object interrupting the laser light curtain, and calculating the direction of movement and speed of the interrupting object relative to the ship by processing data associated with the pulsed laser beam reflected back from the interrupting object.

BRIEF DESCRIPTION OF THE DRAWINGS

Some of the features, advantages, and benefits of the present invention having been stated, others will become apparent as the description proceeds when taken in conjunction with the accompanying drawings, presented for solely for exemplary purposes and not with intent to limit the invention thereto, and in which:

FIG. 6 is an exemplary top plan schematic view of a laser light curtain having objects therein;

FIG. 7 shows a top plan view of one arrangement of laser light curtains to avoid blind spots in the surveillance coverage;

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

FIGS. 1–9 illustrate, in a ship S at rest on a water surface W, an apparatus 20 for detecting an object approaching the ship along an approach surface, typically the surface of the water or along a dock or pier. Those skilled in the art should understand that the following description will focus generally on a water surface W as the approach surface to the ship S and that the invention is described in those terms by way of non-limiting example, but is intended to cover other surfaces along which the ship may be approached.

Figure 4:
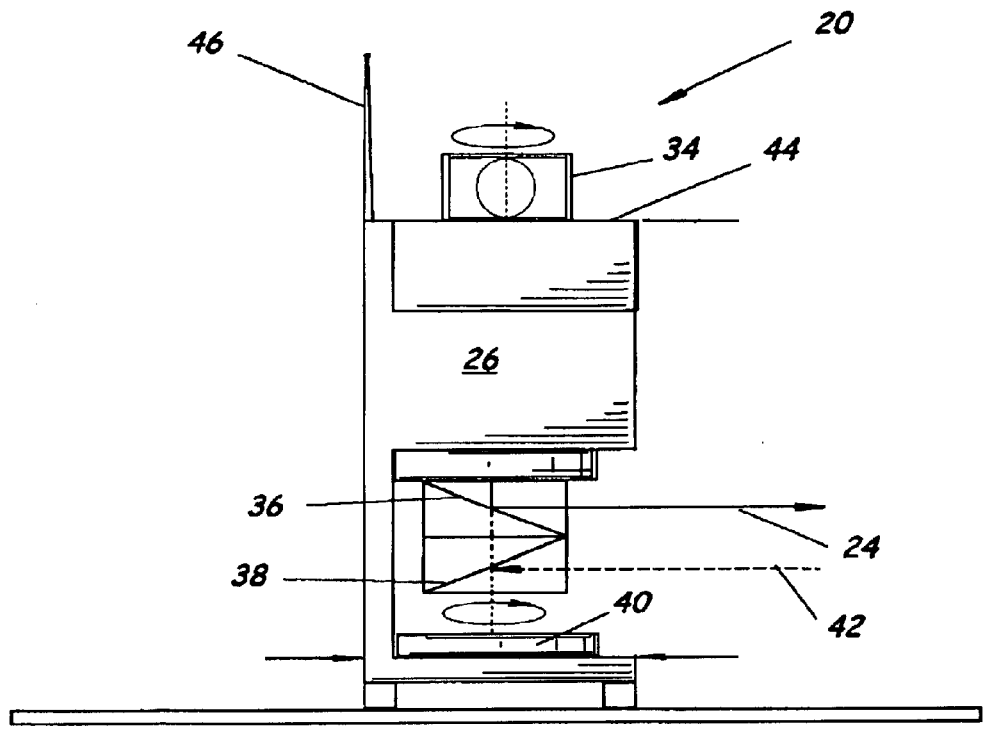
FIG. 4 shows a side schematic view of another embodiment of the laser rangefinder of FIG. 2.

The apparatus 20 comprises a laser light curtain 22 having at least one pulsed laser light beam 24 extending radially from the ship S toward a perimeter P thereabout, the laser light curtain positioned spaced apart from and approximately parallel to the water surface W for detecting an object O interrupting the light curtain. At least one pulsed laser rangefinder 26 is connected to the ship S and positioned outboard therefrom to generate the laser light curtain 22, a preferred laser being an infrared beam. A power source (not shown) is connected to the pulsed laser rangefinder 26 to supply power thereto. A processor 28 is connected to the pulsed laser rangefinder 26 to process data therefrom, and at least one display 30 is connected to the processor to display information obtained from the processed data. As illustrated in FIG. 4, the rangefinder 26 may include a local processor 44 for functions such as scanner control, data acquisition and processing, target identification and tracking, alarm and communication to a central monitoring system. Communication may be wireless between local processor 44 and the central monitoring system such as central processor 28, as shown in FIG. 4 by the telemetry data link antenna 46.

Figure 1:
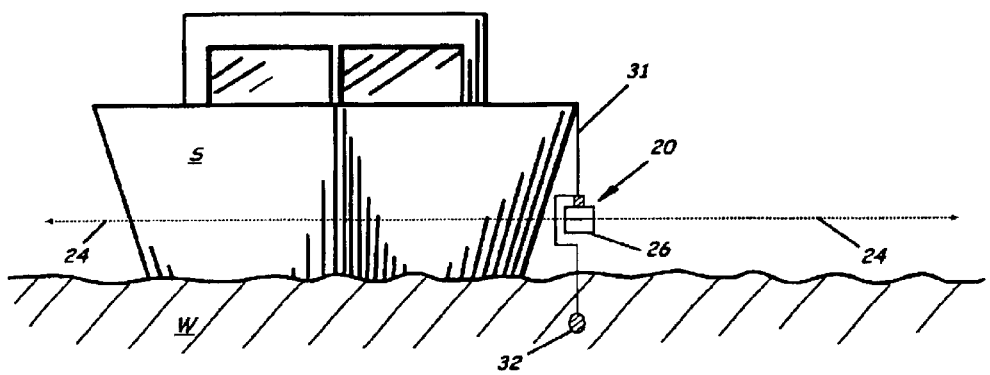
FIG. 1 is a schematic diagram illustrating the apparatus according to an embodiment of the present invention.

In a preferred embodiment of the apparatus 20, as seen in FIG. 1, the pulsed laser light rangefinder 26 is connected to the ship S by a connector 31 extending from the ship generally vertically downwardly toward the surface of the water. More preferably, the pulsed laser rangefinder 26 connected to the ship S includes a stabilizer 32 to aid in maintaining stability of the device. An advantageous position for the stabilizer 32, as shown in FIG. 1, is below the surface of the water carried on a distal portion of the connector 31. The stabilizer 32 may be simply a heavy weight, or any other effective means in the art. In the case of a solid approach surface, such as the surface of a dock or pier, the stabilizer may be positioned close to the surface and would still serve to steady the device.

Figure 9:
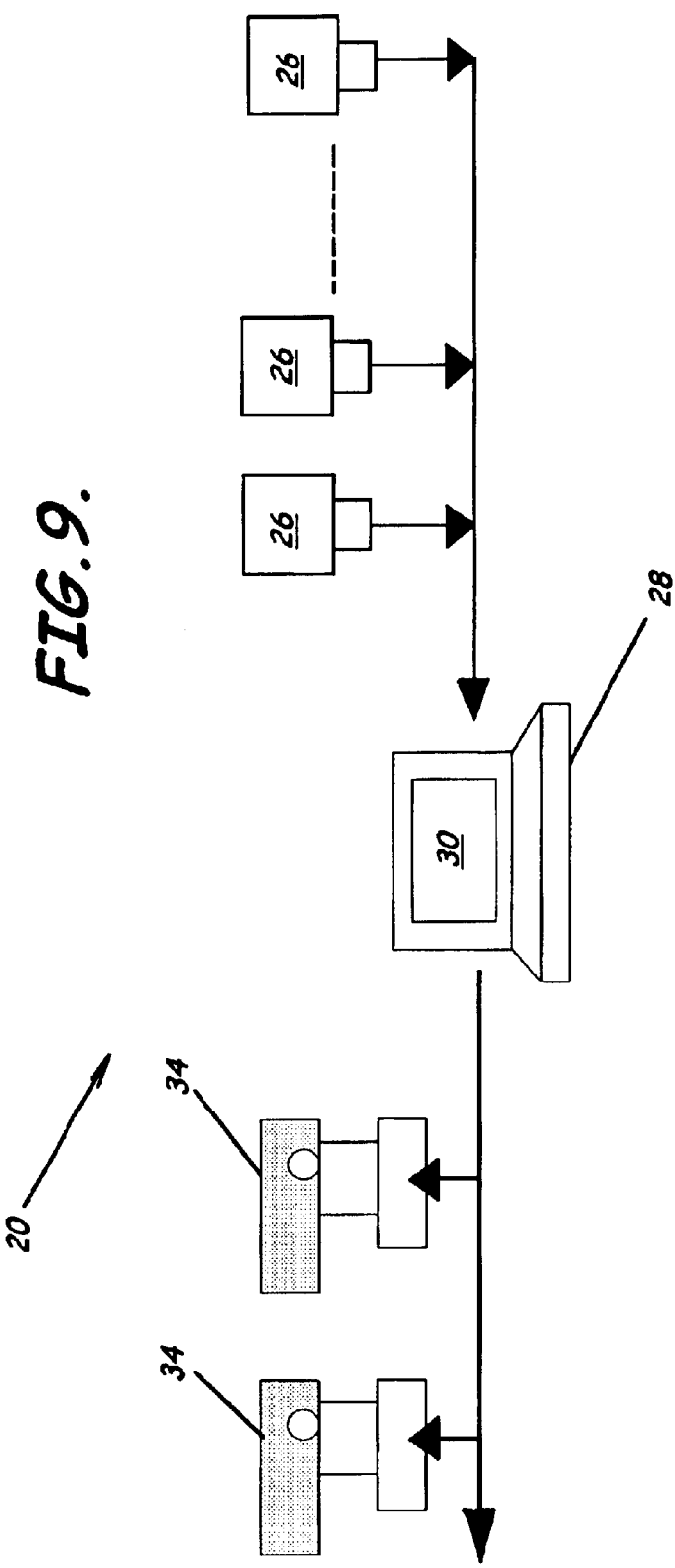
FIG. 9 diagrammatically illustrates the operative relation of various components of the present invention.

The apparatus 20 includes a processor 28 for determining from the processed data the position and movement of the interrupting object O relative to the ship S. As illustrated in FIG. 9, the processor 28 may be operatively linked to control at least one interrupting object O tracking device selected from an optical detector, a search light, and a weapon. The skilled will understand that the optical detector comprises such devices as a camera, and binoculars.

Additionally, the processor 28 activates an alarm signal responsive to an interrupting object O. The alarm may be the ship's own internal alarm signal responsive to an interrupting object O, and may comprise at least one alarm selected from a visual alarm and an audible alarm. The processor 28 may also activate a warning signal directed to an interrupting object O, the warning signal comprising at least one warning selected from a visual warning, an audible warning, and a warning shot from a weapon. In such an embodiment, the processor 28 advantageously increases the intensity of the warning signal responsive to continuing approach by the interrupting object O. For increased ship's security, the processor 28 may be operatively linked to at least one weapon (not shown) on the ship S to activate the weapon to fire on an interrupting object O. For example, the processor 28 activates the weapon responsive to an interrupting object O being at a predetermined distance from the ship. In another preferred embodiment of the invention, the processor 28 acquires an initial data profile of objects within the light curtain 22 on activation of the apparatus 20 for comparing with and differentiating a newly detected interrupting object O.

Figure 2:
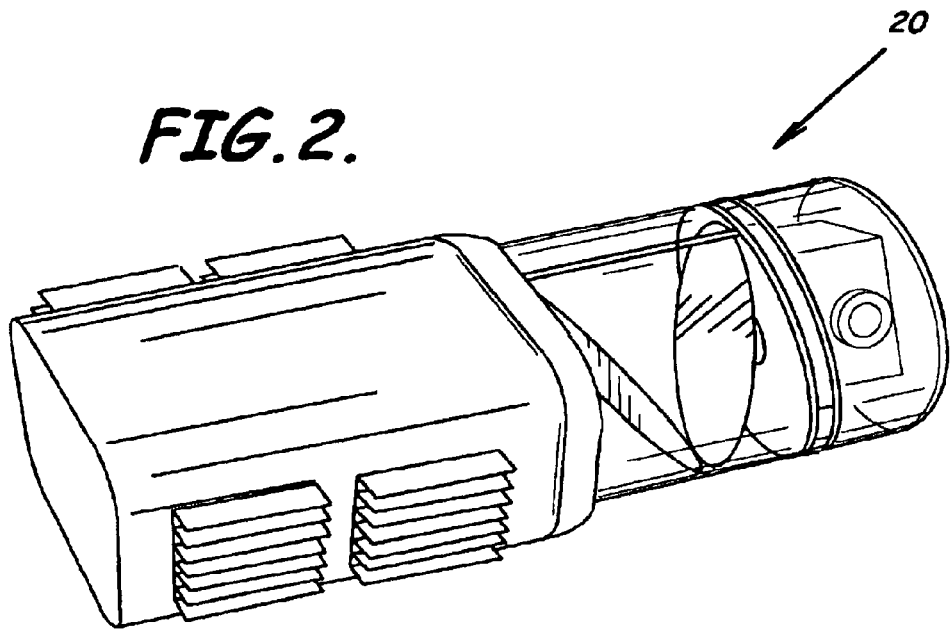
FIG. 2 is a perspective view of a typical pulsed laser rangefinder as included in the invention.
Figure 3:
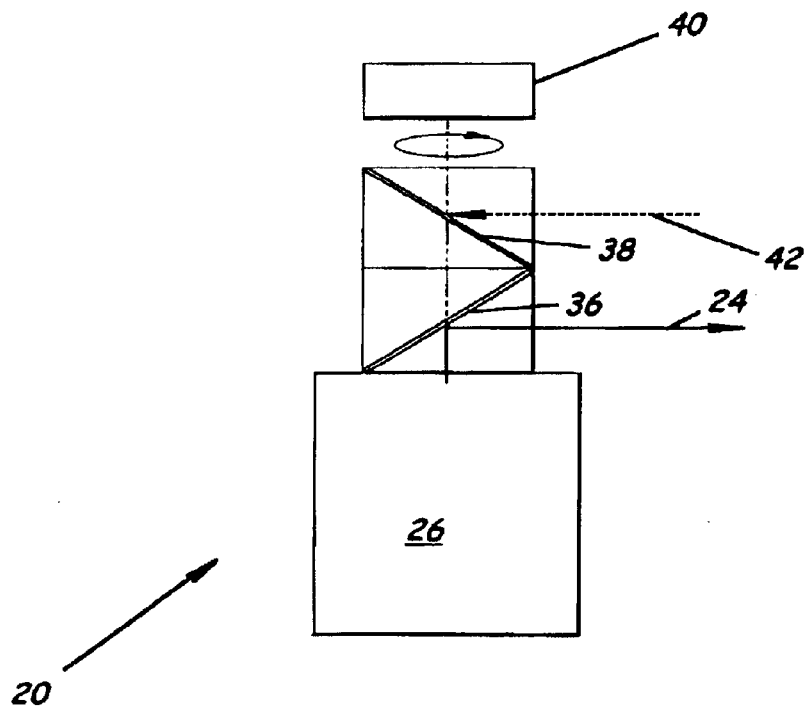
FIG. 3 is a schematic diagram of the rangefinder of FIG. 2.

The pulsed laser rangefinder 26 is generally as known in the art and includes a single laser source and a single receiver/detector 40. Typical laser rangefinder 26s useful in the invention are shown in FIGS. 2–4. The pulsed laser beam 24 is preferably an infrared beam generated by a laser diode. As shown, the pulsed laser rangefinder 26 comprises a laser source producing a laser beam 24, a rotating mirror 36 having a reflecting surface positioned at approximately a 45° angle to the laser beam so as to reflect the beam radially from the rangefinder thereby generating the laser light curtain 22, and a second rotating mirror 36 at a 45° angle to a single receiver or detector 40 for detecting pulsed laser beams reflected back to the rangefinder from an object O interrupting the laser light curtain. For example, as shown in FIG. 7, objects found within or entering the light curtain 22 will reflect a pulsed laser beam back to the rangefinder 26 and are thus detected by the apparatus 20 described.

Figure 10:
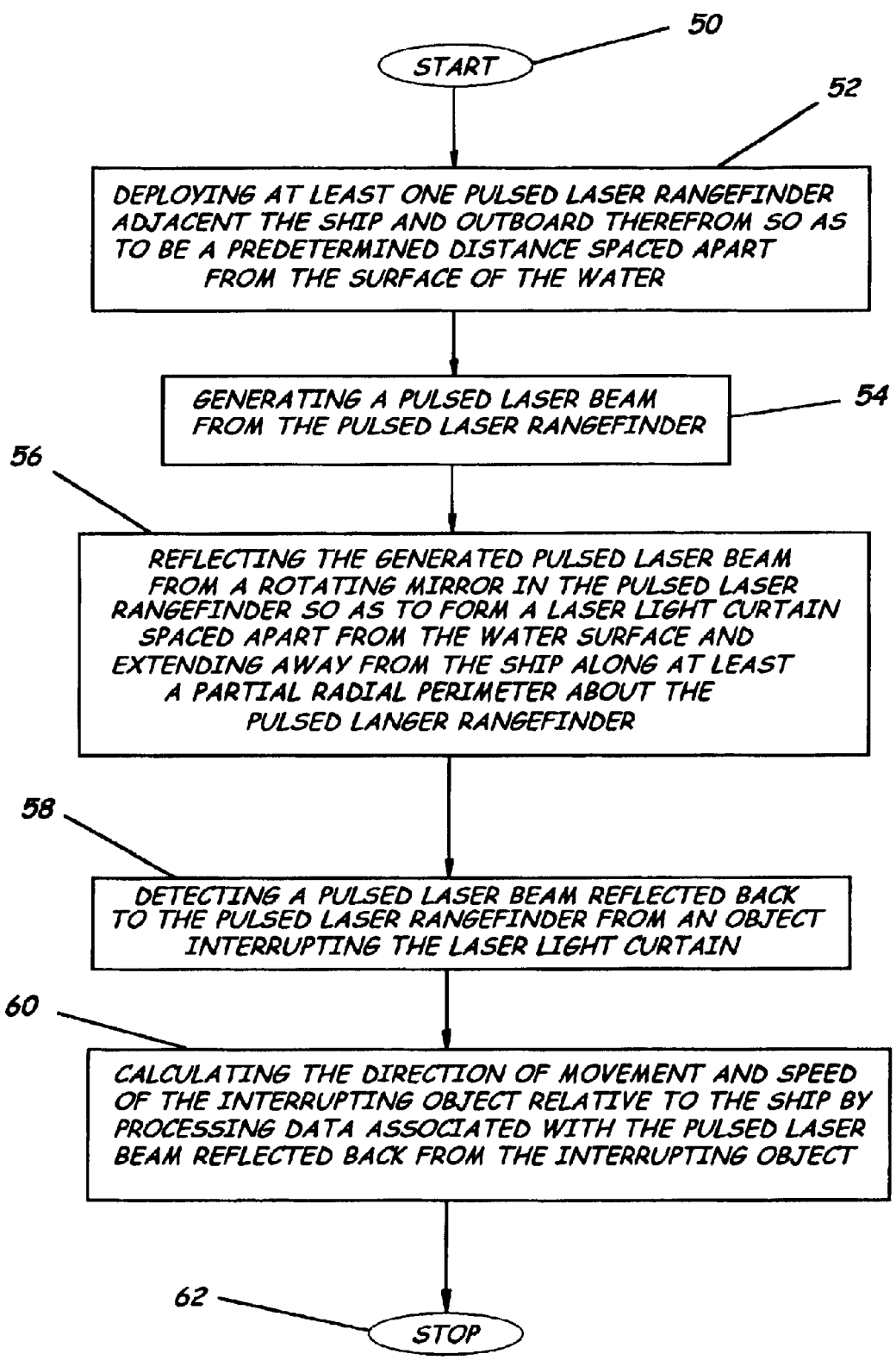
FIG. 10 shows a block diagram illustrating the method of the invention.

Additional aspects of the invention include, in a ship S at rest on a water surface W, a method of detecting an object approaching the ship on the surface of the water. The method, illustrated in a block diagram in FIG. 10, comprises from the start 50 deploying 52 at least one pulsed laser rangefinder 26 adjacent the ship S and outboard therefrom so as to be a predetermined distance spaced apart from the surface of the water; generating a pulsed laser beam 24 from the pulsed laser rangefinder; reflecting the generated pulsed laser beam from a rotating mirror in the pulsed laser rangefinder so as to form a laser light curtain 22 spaced apart from the water surface W and extending away from the ship along at least a partial radial perimeter P about the pulsed laser rangefinder; detecting a pulsed laser beam reflected back 42 to the pulsed laser rangefinder from an object O interrupting the laser light curtain; and calculating the direction of movement and speed of the interrupting object relative to the ship by processing data associated with the pulsed laser beam reflected back 42 from the interrupting object, wherein the method stops 62.

In the method, deploying 52 may further comprise connecting the pulsed laser rangefinder 26 to the ship S by a connector 31 extending from the ship generally vertically downwardly toward the surface of the water, and stabilizing the pulsed laser rangefinder. In one embodiment of the method, stabilizing further comprises connecting a stabilizer 32 to the pulsed laser rangefinder 26, wherein the stabilizer is positioned below the surface of the water. Deploying in the method also comprises connecting the pulsed laser rangefinder 26 to the ship S by a connector 31 extending from the ship generally vertically downwardly toward the surface of the water, the connector having a distal portion extending below the surface of the water and having a stabilizer 32 positioned thereon.

Additionally, in an advantageous application, the method further comprises controlling at least one interrupting object O tracking device selected from an optical detector, a search light, and a weapon, wherein the optical detector comprises a device selected from a camera, and binoculars. Along with an object tracking device 34, an alarm may be activated responsive to detecting an interrupting object O. Moreover, the alarm may be an internal ship alarm signal responsive to detecting an interrupting object O, the alarm signal comprising at least one alarm selected from a visual alarm and an audible alarm. However, the alarm may also be a warning signal directed to the interrupting object O, the warning signal comprising at least one warning selected from a visual warning, an audible warning, and a warning shot from a weapon. In activating such an alarm, the intensity of the warning signal may be increased responsive to the interrupting object O approaching the ship S, and may further comprise activating at least one weapon on the ship to fire on the interrupting object, and particularly when the interrupting object reaches a predetermined distance from the ship.

Detecting, in a preferred embodiment of the method, includes acquiring an initial data profile of objects within the light curtain 22 for comparing with and differentiating a newly interrupting object O. It should also be understood that detecting preferably comprises a single detector 40, and generating comprises a single laser source, typically a laser diode. In operation of the apparatus 20, reflecting comprises a rotating mirror 36 having a reflecting surface positioned at approximately a 45° angle to the laser beam 24 generated, so as to reflect the beam radially from the rangefinder 26 thereby generating the laser light curtain 22. In detecting, a pulsed laser beam reflected back 42 to the rangefinder 26 from an object O interrupting the laser light curtain is reflected by another mirror 38 toward the receiver/detector 40.

Figure 5:
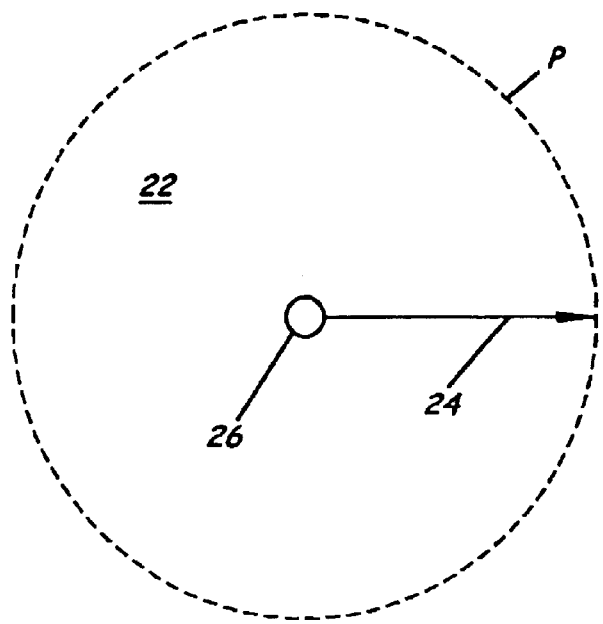
FIG. 5 illustrates a top plan view of a laser light curtain extending radially from a laser rangefinder as employed in the invention.

By way of example, the model LMS-Q250 laser rangefinder 26 marketed by RIEGL USA, Inc. was originally designed for the acquisition of tunnel profiles from moving railcars. Thus it is rugged, accurate and extremely fast. In the basic operation of the LMS-Q250 a laser rangefinder 26 transmit beam 24 is rotated 90° as it is reflected from a mirror 36 situated above it at 45° to the incident beam. This mirror 36 rotates about the initial transmit beam axis, as shown in FIGS. 3–4, thereby defining a two-dimensional plane extending radially over 360° around the rangefinder 26, as seen in FIG. 5.

With reference to FIGS. 2–4, viewed from the top it is apparent that the beam path about the mirror's rotation axis forms a type of light curtain 22. This light curtain 22 extends over the effective range of the device, approximately 250 meters in case of the LMS-Q250. Acquiring individual range measurements at a rate of about 20 khz and a scan rate of about 40 hertz, the resulting profile of the surrounding two dimensional space is of extremely high spatial resolution. Thus, an interrupting object O passing through the light curtain 22 plane, as defined by the laser beam path, will be detected along with its position within the plane at a rate of 40 times per second.

Figure 8:
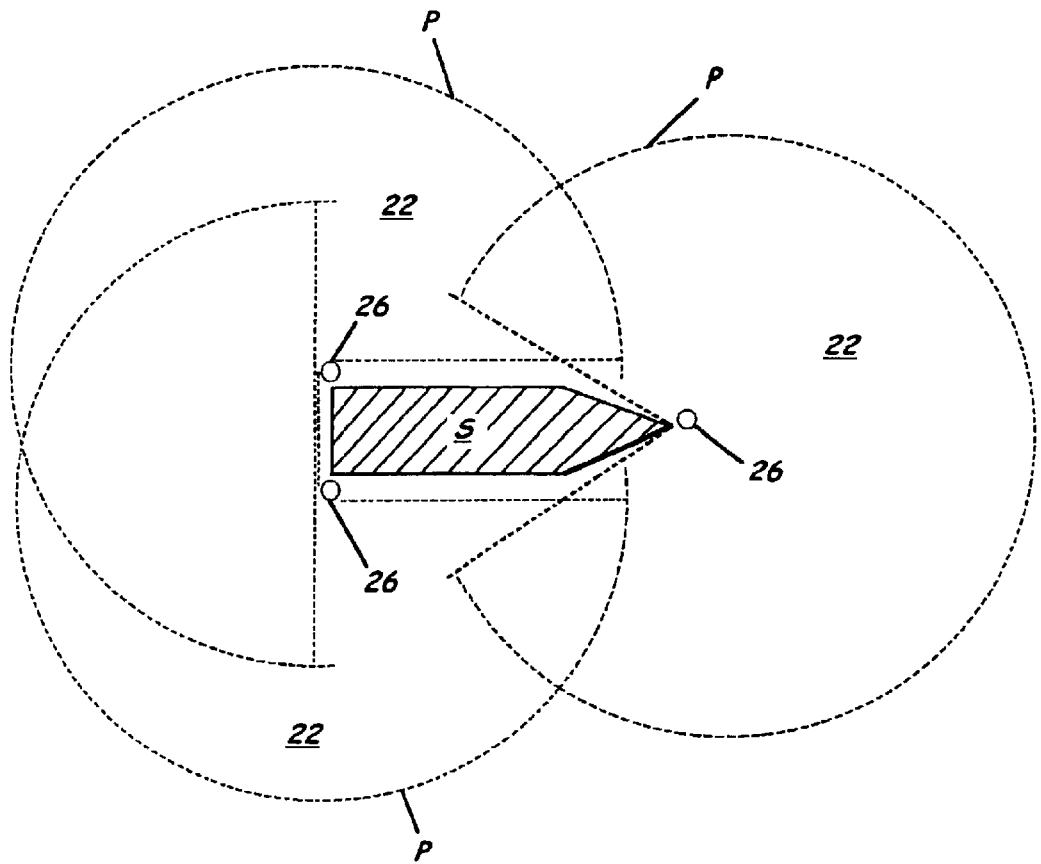
FIG. 8 is a top plan view of an arrangement of the present invention to provide full perimeter surveillance around a ship.

The operational concept of the apparatus 20 becomes clear when viewed from above a ship S and from its side. Illustrated in FIG. 1 is a concept drawing of the LMS-Q250 scanner alongside a ship S and suspended from the deck to generate a laser light curtain 22 spaced apart from the water surface W and extending radially away from the device and the ship. FIG. 8 shows a top plan schematic view of such a system in operation around a stopped vessel. Shown as one possible mounting fixture, a C-shaped frame would hold the rangefinder 26 in place along the connector 31, as a heavy weight or stabilizer 32 suspended below the water line would keep it stable. Since only the distal portion of the cable connector 31 would be exposed to wave action and waves are generally very small in harbors, the rangefinder 26 will tend to remain approximately vertical and perpendicular to the surface of the water. Data from the rangefinder 26 would travel up a connecting line to the processor 28. Viewed from above, as in FIG. 8, it can be appreciated that the apparatus 20 will effect coverage throughout a considerable area around the ship S. Three rangefinders, one installed at the bow and two installed aft would be required to effect complete coverage about a vessel as shown in the figure. It should be understood that additional rangefinders may be included in the system to cover blind spots in the area under surveillance, as shown in FIGS. 6–7.

As shown in the illustration of FIG. 9, in addition to an alarm and operator interface the skilled will recognize that the processor 28 sends commands in real time to cameras, lights, and weapons mounted on pan/tilt platforms. The interrupting object O would be illuminated anywhere within the light curtain 22 coverage area as the processor 28 continuously directs the cameras and lights to track the interrupting object. The tracked interrupting object O would then be visible to a system operator and to other lookouts posted on the ship S.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. In a ship at rest on a water surface, an apparatus for detecting an object approaching the ship on the surface of the water, the apparatus comprising:

a laser light curtain comprising at least one pulsed laser light beam extending radially from the ship toward a perimeter thereabout, said laser light curtain positioned spaced apart from and approximately parallel to the water surface for detecting an object interrupting said light curtain;

at least one pulsed laser rangefinder connected to the ship and positioned outboard therefrom to generate said laser light curtain;

a power source connected to said pulsed laser rangefinder to supply power thereto;

a processor connected to said pulsed laser rangefinder to process data therefrom; and at least one display connected to said processor to display information obtained from the processed data.

2. The apparatus of claim 1, wherein said pulsed laser light rangefinder is connected to the ship by a connector extending from the ship generally vertically downwardly toward the surface of the water.

3. The apparatus of claim 1, wherein said pulsed laser rangefinder includes a stabilizer to aid in maintaining stability.

4. The apparatus of claim 3, wherein said stabilizer is positioned below the surface of the water.

5. The apparatus of claim 1, wherein said pulsed laser rangefinder is connected to the ship by a connector extending from the ship generally vertically downwardly toward the surface of the water and having a distal portion extending below the surface of the water and a stabilizer positioned thereon.

6. The apparatus of claim 1, wherein said processor determines from the processed data position and movement of the interrupting object.

7. The apparatus of claim 1, wherein said processor controls at least one interrupting object tracking device selected from an optical detector, a search light, and a weapon.

8. The apparatus of claim 7, wherein said optical detector comprises a device selected from a camera, and binoculars.

9. The apparatus of claim 1, wherein said processor activates an alarm signal responsive to an interrupting object.

10. The apparatus of claim 1, wherein said processor activates an ship alarm signal responsive to an interrupting object, said alarm signal comprising at least one alarm selected from a visual alarm and an audible alarm.

11. The apparatus of claim 1, wherein said processor activates a warning signal directed to an interrupting object, said warning signal comprising at least one warning selected from a visual warning, an audible warning, and a warning shot from a weapon.

12. The apparatus of claim 11, wherein said processor increases intensity of the warning signal responsive to continuing approach by the interrupting object.

13. The apparatus of claim 1, wherein said processor is operatively linked to at least one weapon on the ship and activates said weapon to fire on an interrupting object.

14. The apparatus of claim 13, wherein said processor activates said weapon responsive to an interrupting object being at a predetermined distance from the ship.

15. The apparatus of claim 1, wherein the processor acquires an initial data profile of objects within the light curtain on activation of the apparatus for comparing with and differentiating an interrupting object.

16. The apparatus of claim 1, wherein said pulsed laser rangefinder comprises a single laser source and a single receiver.

17. The apparatus of claim 1, wherein said pulsed laser rangefinder comprises a laser diode.

18. The apparatus of claim 1, wherein said pulsed laser rangefinder comprises a laser source producing a laser beam, and a rotating mirror having a reflecting surface positioned at approximately a 45° angle to the laser beam so as to reflect the beam radially from the rangefinder thereby generating the laser light curtain.

19. The apparatus of claim 1, wherein said rangefinder comprises a single laser source and a single receiver.

20. In a ship at rest on a water surface, a method of detecting an object approaching the ship on the surface of the water, the method comprising:
deploying at least one pulsed laser rangefinder adjacent the ship and outboard therefrom so as to be a predetermined distance spaced apart from the surface of the water;
generating a pulsed laser beam from the at least one pulsed laser rangefinder;
reflecting the generated pulsed laser beam from a rotating mirror in the pulsed laser rangefinder so as to form a laser light curtain spaced apart from the water surface and extending away from a periphery of the ship along at least a partial radial perimeter thereabout;
detecting a pulsed laser beam reflected back to the pulsed laser rangefinder from an object interrupting the laser light curtain; and
calculating the direction of movement and speed of the interrupting object relative to the ship by processing data associated with the pulsed laser beam reflected back from the interrupting object.

21. The method of claim 20, wherein deploying comprises connecting the pulsed laser rangefinder to the ship by a connector extending from the ship generally vertically downwardly toward the surface of the water.

22. The method of claim 20, further comprising stabilizing the pulsed laser rangefinder.

23. The method of claim 22, wherein stabilizing further comprises connecting a stabilizer to the pulsed laser rangefinder, wherein the stabilizer is positioned below the surface of the water.

24. The method of claim 20, wherein deploying comprises connecting the pulsed laser rangefinder to the ship by a connector extending from the ship generally vertically downwardly toward the surface of the water, the connector having a distal portion extending below the surface of the water and having a stabilizer positioned thereon.

25. The method of claim 20, further comprising controlling at least one interrupting object tracking device selected from an optical detector, a search light, and a weapon.

26. The method of claim 25, wherein the optical detector comprises a device selected from a camera, and binoculars.

27. The method of claim 20, further comprising activating an alarm signal responsive to detecting an interrupting object.

28. The method of claim 20, further comprising activating a ship alarm signal responsive to detecting an interrupting object, the alarm signal comprising at least one alarm selected from a visual alarm and an audible alarm.

29. The method of claim 20, further comprising activating a warning signal directed to the interrupting object, the warning signal comprising at least one warning selected from a visual warning, an audible warning, and a warning shot from a weapon.

30. The method of claim 29, further comprising increasing the intensity of the warning signal responsive to the interrupting object approaching the ship.

31. The method of claim 20, further comprising activating at least one weapon on the ship to fire on an interrupting object.

32. The method of claim 31, wherein activating occurs at a predetermined distance from the ship.

33. The method of claim 20, wherein detecting further comprises acquiring an initial data profile of objects within the light curtain for comparing with and differentiating an interrupting object.

34. The method of claim 20, wherein generating comprises a single laser source.

35. The method of claim 20, wherein detecting comprises a single detector.

36. The method of claim 20, wherein generating comprises energizing a laser diode.

37. The method of claim 20, wherein reflecting comprises a rotating mirror having a reflecting surface positioned at approximately a 45° angle to the laser beam generated, so as to reflect the beam radially from the rangefinder thereby generating the laser light curtain.

38. The method of claim 20, wherein detecting comprises a rotating mirror having a reflecting surface positioned at approximately a 45° angle to the laser light curtain, so as to direct to a detector a pulsed laser beam reflected back to the rangefinder from an object interrupting the light curtain.

* * * * *